Figure 1:
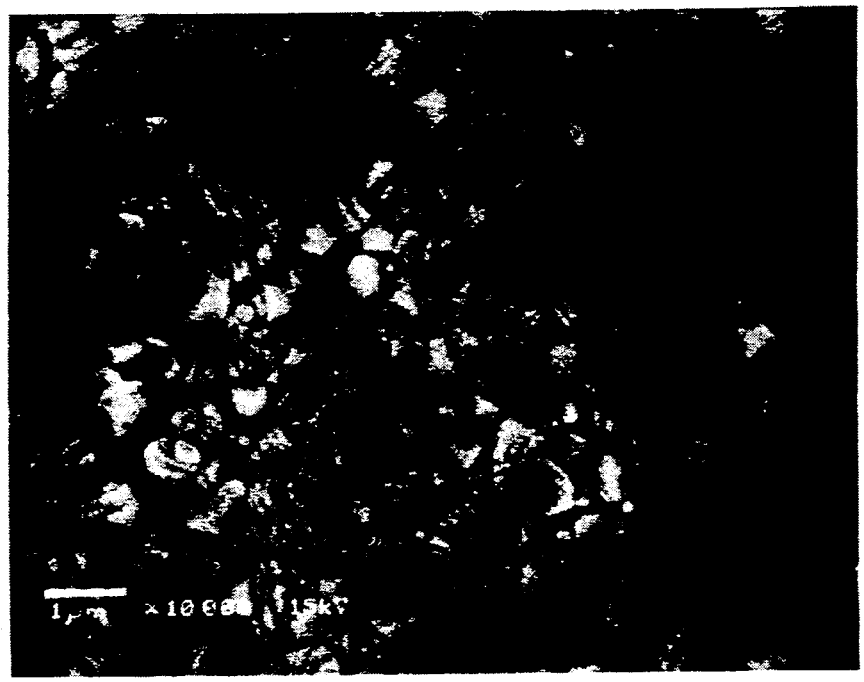

United States Patent [19]

Wilson

[11] Patent Number: 5,128,289
[45] Date of Patent: Jul. 7, 1992

[54] X7R DIELECTRIC CERAMIC COMPOSITION AND CAPACITOR MADE THEREFROM

[75] Inventor: James M. Wilson, Victor, N.Y.

[73] Assignee: Ferro Corporation, Cleveland, Ohio

[21] Appl. No.: 623,785

[22] Filed: Dec. 7, 1990

[51] Int. Cl.$^5$ .............................................. C04B 35/46
[52] U.S. Cl. ................................... 501/137; 501/138; 501/139; 361/321
[58] Field of Search ...................... 501/137, 138, 139; 361/321

[56] References Cited

U.S. PATENT DOCUMENTS

| | | | |
|---|---|---|---|
| 4,379,319 | 4/1983 | Wilson | 361/321 |
| 4,670,243 | 6/1987 | Wilson | 423/598 |
| 4,816,430 | 3/1989 | Chu | 501/137 |
| 4,863,883 | 9/1989 | Menashi et al. | 501/137 X |
| 4,882,305 | 11/1989 | Chu et al. | 501/138 |
| 4,939,108 | 7/1990 | Dean | 501/137 |
| 4,988,650 | 1/1991 | Takagi et al. | 501/138 X |
| 5,084,424 | 1/1992 | Abe et al. | 501/137 |

OTHER PUBLICATIONS

BaTiO$_3$ Based Solid Solution of Niobates and Tantalates of Transition Metals Soviet Phys. Solid State 2, 66 (1960), translated from Fizika Tverdogo Tela vol. 2, No. 1, pp. 73-79, Jan. 1960.

Hennings and Rosentein (Temperature-Stable Dielectric Based on Chemically Inhomogeneous BaTiO$_3$, Apr. 1984, vol. 67, No. 4 of Journal of the American Ceramic Society.

Barium Titanate Based Ceramic Materials for Dielectric Use, Int. J. High Technology Ceramics 3, pp. 91-110, 1987 Elsevier Applied Science Publishers Ltd., England.

*Primary Examiner*—William R. Dixon, Jr.
*Assistant Examiner*—Lisa M. Schull
*Attorney, Agent, or Firm*—Shlesinger Fitzsimmons Shlesinger

[57] ABSTRACT

A barium titanate based dielectric ceramic composition having a temperature coefficient range of about $+/-15\%$ form its value at 25° C. over a temperature range of $-55°$ C. to 125° C., and a dielectric constant in excess of 5000, is prepared from a ternary system comprising barium titanate, nickel niobate and manganese niobate in the molar ratios of approximately 97.23 mole % of BaTiO$_3$, 2.35 mole % of NiO$_{(1-x)}$·NbO$_{2.5(x)}$, and 0.42 mole % of MnO$_{1-y}$·NbO$_{2.5(y)}$, where x may equal approximately 0.73 and y approximately 0.53. Tantalum is also used in place of the niobium.

8 Claims, 1 Drawing Sheet

X7R DIELECTRIC CERAMIC COMPOSITION AND CAPACITOR MADE THEREFROM

BACKGROUND OF THE INVENTION

This invention relates to an improved dielectric ceramic composition of the X7R variety, and more particularly to an improved such composition which is capable of exhibiting a dielectric constant (K') of greater than 5,000. Even more particularly, this invention relates to an improved ceramic capacitor made from such material.

The art relating to the production of ceramic dielectric compositions for use in producing monolythic ceramic capacitors is extremely highly developed. One reason for such a plethora of prior art is that, with even the slightest apparent variations in the components or ratios of components in a dielectric composition, the resultant changes in the characteristics of a ceramic capacitor are often new and unexpected. In connection with the invention described hereinafter, it has been discovered that the dielectric constant of a barium titanate ($BaTiO_3$) based material can be increased substantially, and surprisingly, by utilizing a novel ternary system.

At the outset, it should be noted that the prior art has disclosed various temperature-stable barium titanate compositions which are claimed to produce a dielectric constant in the range of 3000 to 4700. U.S. Pat. No. 4,882,305, for example, suggests that a barium titanate mixture containing cobalt oxide and niobium pentoxide, can produce multi-layer ceramic capacitors which meet the X7R rating of the U.S. Electronics Industries Association (EIA) Standard—i.e., its temperature coefficient of dielectric constant (K') varies no more than about ±15% from the reference value at 25° C. over a temperature range of −55° C. to 125° C.

However, the compositions disclosed in the above-noted patent yielded either lower than desired insulation resistance values, or higher dissipation factors than desired for most commercial applications.

Compositions disclosed in U.S. Pat. No. 4,816,430 which issued a short time before the 4,882,305 patent, also disclosed temperature-stable barium titanate compositions which exhibit dissipation factors below about 1.8%, and insulation resistance values above about 10,000 ohm-farads at 25° C., and 1,000 ohm-farads at 125° C. The problem with these compositions, however, is that their dielectric constants are reduced to about 4,000 whenever the X7R temperature characteristic is achieved.

Further refinements of these compositions are disclosed in U.S. Pat. No. 4,939,108, which suggests that even greater dielectric constants can be achieved by improving the homogeneity of the dopant distribution in the barium titanate composition. Although this latter patent suggests that dielectric constants in excess of 4900 can be achieved, the process for producing the composition appears to be very impractical. Removal of undesirable chlorides is difficult at best, and expensive washing and pollution control steps would become necessary to commercialize such a process.

The homogeneity theory advanced in the above-noted U.S. Pat. No. 4,939,108, conflicts with the conclusions reached by Hennings and Rosentein (*Temperature-Stable Dielectric based On Chemically Inhomgeneous $BaTiO_3$*, Apr., 1984, Vol. 67, No. 4 of Journal of the American Ceramic Society), who concluded from tests that they conducted that X7R—type dielectric ceramics owe their TC characteristics, not only to small grain size, but to the nature of the chemically inhomogeneous materials that are employed. In his article entitled *Barium Titanate Based Ceramic Materials For Dielectric Use*, Int. J. High Technology Ceramics 3, pp. 91-110, 1987 Elsevier Applied Science Publishers Ltd., England, Hennings recognized that an increase in the dielectric constant of barium titanate compositions can be associated with a decrease in grain size, and again noted that high dielectric constant, temperature-stable materials exhibit chemically heterogeneous grains, rather than homogeneous grains. However, as will be noted hereinafter, none of the foregoing prior art teachings suggests the novel ternary system disclosed hereinafter, and the unexpectantly high dielectric constant which is achieved by such a composition.

The closest prior art known to the applicant appears to be that of a Soviet publication entitled $BaTiO_3$-*Based Solid solution of Niobates And Tantalates Of Transition Metals*, Soviet Phys. Solid State 2, 66 (1960), translated from Fizika Tverdogo Tela Vol. 2, No. 1, pp. 73-79, Jan., 1960. This article discloses or suggests the use of solid solutions composed of barium titanate and metaniobates, pyroniobates, and tantalates of Mn, Ni, and Co to produce very high dielectric constant, non-temperature stable materials. However, conventionally calcined barium titanate was employed with the various stoicheometric niobates and tantalates, thus producing bodies which would not be acceptable for use as X7R dielectrics. Moreover, the Soviet article discusses only two component systems—i.e., barium titanate and a single niobate. (See FIGS. 1-4 of the Soviet publication). No attempt is made to either incorporate non-stoicheometric niobates or tantalates, or combinations thereof, as is the case with the novel ternary system disclosed herein.

Accordingly, it is an object of this invention to provide an improved, inexpensively processed dielectric ceramic composition which qualifies as an X7R type dielectric, and which is capable of resulting in dielectric constants substantially greater than 5000.

Still another object of this invention is to produce an improved dielectric ceramic composition utilizing normal processing steps on a novel barium titanate based ternary system.

A further object of this invention is to produce improved multi-layer capacitors from the novel composition disclosed herein.

Other objects of the invention will be apparent hereinafter from the specification and from the recital of the appended claims, particularly when read in conjunction with accompany drawing.

SUMMARY OF THE INVENTION

The ternary system comprising a mixture of barium titanate of uniform grain size and high purity, nickel niobate, and manganese niobate, are blended in a aqueous slurry, dried and pulverized to form a finely divided, homogeneous powder. The powder is then mixed with a solvent-based acrylic binder and cast into sheets which are then screen printed with electrode materials and laminated to form multi-layer ceramic capacitors. Such capacitors have exhibited dielectric constants as high as 5700.

THE DRAWING

FIG. 1 is a photomicrograph showing enlarged by 10,000× a thermally etched, fired microstructure of a dielectric layer of a capacitor made according to one embodiment of this invention.

PREFERRED EMBODIMENTS OF THE INVENTION

As a typical example of this invention, a mixture of 97.23 mole % high purity, uniform particle size $BaTiO_3$, 2.35 mole % of a $NiO_{(1-x)} \cdot NbO_{2.5(x)}$ component, and about 0.42 mole % of a $MnO_{(1-y)} \cdot NbO_{2.5(y)}$ component was thoroughly blended in an aqueous slurry. In the above-noted mixture, the high purity, uniform particle size barium titanate was of the type sold by the Transelco division of Ferro Corporation as code 219-9. This type of barium titanate is produced by a precipitation process similar in nature to that taught for example in my U.S. Pat. No. 4,670,243, rather than being prepared by the old, prior art calcining method referred to above in connection with the Soviet publication. As for the above-noted niobate-type additives, X may equal approximately 0.73, and Y may equal approximately 0.53. These nickel and manganese niobate additives are novel, and when mixed as above, and processed as noted hereinafter, produce a ceramic body which, when properly processed, exhibits extremely high dielectric constants and X7R TC characteristics.

Referring again to the above-noted mixture of the barium titanate and niobate additives, the slurried mixture was dried and pulverized into a finely-divided homogeneous dielectric powder. The dielectric powder was then mixed with a solvent-based acrylic binder system of conventional form, thus to prepare a casting slip. The resultant slip was cast into sheets, cut to size and then screen printed with from 70 Ag·30 Pd to 100% Pd electrode materials. The sheets were than stacked, laminated and cut into multi-layer capacitors having a conventional configuration, such as illustrated for example in FIG. 2 in my U.S. Pat. No. 4,379,319, the contents of which is incorporated herein by reference. The capacitors were then sintered over a range of temperatures from about 1290° C.-1325° C. and were silver terminated using DuPont 25 No. 6337 conductor material.

The above-noted resultant multi-layer capacitors utilizing Ferro EMD DP 34-072 70 Pd/30 Ag electrode material were tested and exhibited the following results:

| Dielectric Constant at Room Temp. | K' = 5729 |
|---|---|
| Dissipation Factor at 1 VRMS | 1.56% |

| | |
|---|---|
| −55° C. | −5.0% |
| +85° C. | −12.0% |
| +125° C. | −9.0% |
| 25° C. Insulation Resistance (R × C) | 13,430 ohm-farads |
| 125° C. Insulation Resistance (R × C) | 3,128 ohm-farads |
| Dielectric Breakdown Ts = 1290° C./2 Hrs. | >800 V/Mil. |

As can be seen from these results, multi-layer 15 capacitors can be manufactured to EIA X7R specification with very high dielectric constants heretofore not obtainable using standard ceramic processing procedures. This unexpected result is achieved by combining barium titanate with the above-noted niobate additives which also have some of the additional following characteristics:

Preferably the barium titanate is provided as a prereacted powder, crystallite form in which the particle size ranges anywhere from approximately 0.2 to 0.5 microns. Ideally also the niobium particle size ranges anywhere from 0.2 to 1.2 microns; the NiO anywhere from 0.1 to 1.0 microns, and the MnO oxide in a range of 0.1 to 1.0 microns. As shown in FIG. 1, for example, the grain size has been optimized to the range of 0.7-0.8 microns. The nickel niobate and manganese niobate additives help to shift the Curie point of the barium titanate and to maneuver the temperature coefficient (TC) into the X7R specification. The nickel composition is extremely helpful in effecting the shifting of the TC, while the manganese helps to broaden the TC and improve insulation resistance. It is believed also that additional penta-valent ions such as $Ta_2O_5$ could be used, if desired, in place of the niobium without departing from the scope of this invention. Ideally also, the above-noted barium titanate, which is used in this invention, will exhibit a pronounced tetragonal crystalline phase, as disclosed for example in my U.S. Pat. No. 4,670,243.

From the foregoing it will be apparent that the present invention provides an extremely satisfactory X7R dielectric composition, which in turn, can be utilized to produce a monolythic ceramic capacitor which exhibits an extremely high dielectric constant, for example in excess of 5000. Moreover, while this invention has bee illustrated and described in connection with only certain embodiments thereof, it will be apparent that it is capable of still further modification, and that this application is intended to cover any such modifications as may fall within the scope of one skilled in the art or the appended claims.

I claim:

1. A ceramic dielectric composition in powder form capable of producing capacitors having a temperature coefficient range of about ±15% from its value at 25° C. over a temperature range of −55° C. to 125° C., and a dielectric constant in excess of 5000, and consisting essentially of the ternary system of BaTiO and the nonstoichiometric niobates of $NiO_{(1-x)}$, $NbO_{2.5(x)}$ and $MnO_{(1-y)}$, $NbO_{2.5(y)}$, said $BaTiO_3$ being a prereacted powder in crystallite form, the niobium particle sizes ranging anywhere from approximately 0.2 to 1.2 microns, and the nickel oxide and manganese oxide particle sizes ranging anywhere from approximately 0.1 to 1.0 microns, the constituents of said composition being present in the molar ratios of about 97.23 mole % of $BaTiO_3$, 2.35 mole % of $NiO_{(1-x)}$, $NbO_{2.5(x)}$, and 0.42 mole % of $MnO_{(1-y)}$, $NbO_{2.5(y)}$, and wherein x is approximately 0.73 and y is approximately 0.53.

2. A dielectric composition as defined in claim 1, wherein said prereacted powder has a particle size in the range of anywhere from approximately 0.2 microns to approximately 0.5 microns.

3. A ceramic dielectric composition in powder form capable of producing capacitors having a temperature coefficient range of about ±15% from its value at 25° C. over a temperature range of −55° C. to 125° C., and a dielectric constant in excess of 5000, and consisting essentially of the ternary system of $BaTiO_3$ and the non-stoichiometric tantalates of $NiO_{(1-x)}$, $TaO_{2.5(x)}$ and $MnO_{(1-y)}$, $TaO_{2.5(y)}$, said $BaTiO_3$ being a prereacted powder in crystallite form, the tantalate particle sizes ranging anywhere from approximately 0.2 to 1.2 microns, and the nickel oxide and maganese oxide particle sizes ranging anywhere from approximately 0.1 to 1.0 microns, the constituents of said composition being present in the molar ratios of about 97.23 mole % of $BaTiO_3$, 2.35 mole % of $NiO_{(1-x)}$, $TaO_{2.5(x)}$ and 0.42 mole % of $MnO_{(1-y)}$, $TaO_{2.5(y)}$ and wherein x is approximately 0.73 and y is approximately 0.53.

4. A multi-layer capacitor made from the composition defined in claim 1.

5. A multi-layer capacitor made from the composition defined in claim 3.

6. A ceramic dielectric composition as defined in claim 3, wherein said prereacted powder has a particle size in the range of anywhere from approximately 0.2 microns to approximately 0.5 microns.

7. A barium titanate based ceramic dielectric composition in powder form capable of producing capacitors having a temperature coefficient range of about ±15% from its value at 25° C. over a temperature range of −55° C. to 125° C., and a dielectric constant in excess of 5000, including non-stoichiometric niobates of $NiO_{(1-x)}$, $NbO_{2.5(x)}$ and $MnO_{(1-y)}$, $NbO_{2.5(y)}$ wherein the niobium particle sizes range anywhere from approximately 0.2 to 1.2 microns, and the nickel oxide and manganese oxide particle sizes range anywhere from approximately 0.1 to 1.0 microns, and wherein x is approximately 0.73 and y is approximately 0.53.

8. The ceramic dielectric composition as defined in claim 7, wherein said niobates are present in the molar ratios of about 2.35 mole % of $NiO_{(1-x)} \cdot NbO_{2.5(x)}$, and 0.42 mole % of $MnO_{(1-y)} \cdot NbO_{2.5(y)}$.

* * * * *